United States Patent [19]
Cabrera et al.

[11] Patent Number: 5,917,998
[45] Date of Patent: Jun. 29, 1999

[54] METHOD AND APPARATUS FOR ESTABLISHING AND MAINTAINING THE STATUS OF MEMBERSHIP SETS USED IN MIRRORED READ AND WRITE INPUT/OUTPUT WITHOUT LOGGING

[75] Inventors: Luis Felipe Cabrera, San Jose; Darrell Don Earl Long, Soquel, both of Calif.

[73] Assignee: International Business Machines Corporation, Armonk, N.Y.

[21] Appl. No.: 08/690,214

[22] Filed: Jul. 26, 1996

[51] Int. Cl.$^6$ .................................................. G06F 11/16
[52] U.S. Cl. ................................ 395/182.04; 711/114
[58] Field of Search ........................ 395/182.03, 182.04, 395/182.18, 185.01, 185.02, 183.01, 183.18, 183.2, 185.07; 711/114, 115, 118, 133, 112; 371/40.15

[56] References Cited

U.S. PATENT DOCUMENTS

| | | |
|---|---|---|
| 4,714,992 | 12/1987 | Gladney et al. . |
| 5,043,876 | 8/1991 | Terry . |
| 5,086,502 | 2/1992 | Malcolm . |
| 5,124,987 | 6/1992 | Milligan et al. . |
| 5,239,637 | 8/1993 | Davis et al. . |
| 5,297,258 | 3/1994 | Hale et al. . |
| 5,325,497 | 6/1994 | Jaffe et al. . |
| 5,418,966 | 5/1995 | Madduri . |
| 5,430,866 | 7/1995 | Lawrence et al. . |
| 5,432,922 | 7/1995 | Polyzois et al. . |
| 5,487,160 | 1/1996 | Bemis . |
| 5,533,190 | 7/1996 | Binford et al. ............... 395/182.04 |
| 5,590,276 | 12/1996 | Andrews ..................... 395/182.04 |
| 5,596,709 | 1/1997 | Bond et al. .................. 395/182.05 |
| 5,617,530 | 4/1997 | Stallmo et al. ............... 395/182.04 |

*Primary Examiner*—Robert W. Beausoliel, Jr.
*Assistant Examiner*—Nadeem Iqbal
*Attorney, Agent, or Firm*—Merchant, Gould, Smith, Edell, Welter & Schmidt, P.A.

[57] ABSTRACT

A method and apparatus that maintains in stable storage an identification of which copies in a mirrored disk system are currently up to date without requiring the use of a logging mechanism. The invention may include a plurality of mirrored disk drives and a processing unit for controlling the writing and reading of data units to and from mirrored disk drives, wherein the processing unit establishes and maintains cohort sets for each mirrored disk drive. The cohort set represents the status of copies of the data units stored on the mirrored disk drives and contains membership information for redundant copies of data units stored in the plurality of mirrored disk drives. The membership information comprises a data structure of 2n status bits for identifying which disks contain current copies of the data units, where n is the number of disks in the system, and wherein the first n bits are used to indicate an intention to update the membership information for the copies and the second n bits are used indicate a current state of the membership information. The data structure may further include log(n) additional bits for identifying each mirrored disk.

73 Claims, 7 Drawing Sheets

METHOD AND APPARATUS FOR ESTABLISHING AND MAINTAINING THE STATUS OF MEMBERSHIP SETS USED IN MIRRORED READ AND WRITE INPUT/ OUTPUT WITHOUT LOGGING

BACKGROUND OF THE INVENTION

1. Field of the Invention

This invention relates in general to fault tolerant storage systems, and more particularly, to a method and apparatus for establishing and maintaining the status of membership sets regarding redundant copies of data used in mirrored read and write input/output without logging.

2. Description of Related Art

A typical digital computer system includes one or more mass storage subsystems for storing data to be processed. In typical mass storage subsystems, the data is stored on disks. Disks are divided into a plurality of tracks at selected radial distances from the center, and sectors defining particular angular regions across each track, with each track and set of one or more sectors comprising a block in which data is stored.

Since stored data may be unintentionally corrupted or destroyed, systems have been developed that create multiple copies of stored data, usually on separate storage devices, so that if the data on one of the devices or disks is damaged, the data may be recovered from one or more of the remaining copies.

One such application includes distributed processing systems that are made up of intelligent workstations adapted to access central databases at source locations. In many of these systems, a given workstation may require access to a single data object form some source database more than once. This requires much duplication of effort by the systems managing the database and the network. To reduce this duplication of effort and to provide increased fault tolerance, it is desirable to maintain replicas of data objects.

Further, both mirrored disk systems and RAID (Redundant Array of Independent Disks) disk systems have been used to provide fault tolerant disk systems for On-Line Database Transaction Processing (OLTP). In a RAID array, the information at corresponding block locations on several disks is used to create a parity block on another disk. In the event of failure, any one of the disks in a RAID array can be reconstructed from the others in the array. RAID architectures require fewer disks for a specified storage capacity, but mirrored disks generally perform better.

Mirroring is a technique for keeping synchronized copies of data on behalf of data managers or applications. Mirroring increases the availability of data by allowing access to it as long as one copy is available. To provide mirroring within a system component, the system needs to track the set of copies that are current. For example, a Logical Volume Manager (LVM) allows users to select and combine disk space from one or more physical disks to create logical volumes, or virtual disk partitions, which can have greater capacity, increased availability, and higher performance than a single drive. When a logging subsystem is present, appropriate log records written to the log can be used to track which copies are current. However, often logging may not be present to record which copies are current.

While mirrored storage provides several advantages, including increased read performance and better fault tolerance, the use of this technology has normally been confined to high-end systems. This is because it was considered to be expensive both in terms of the extra storage required, and in terms of the processing necessary to implement it. Recently, many companies have begun to sell mirrored storage devices which appear to the system to be simple SCSI devices. This, coupled with trends towards smaller systems and dramatic decreases in the cost of storage devices, has made it practical to provide mirroring in small systems as well as large. The result is a need for a simple mirroring technique that can be efficiently implemented either in the file system, or in the device controller of a SCSI device.

Applications and data managers can increase their access to data by having the system maintain several copies in a synchronized, or mirrored, manner. As stated above, access to the data is provided as long as one copy of it is available. When several disks are used in a mirrored fashion, the disks holding the current data must be determined following a total failure, e.g., a loss of power. In a two disk system, this is only a minor problem since the operator can indicate which disk is current. However, this is more difficult when more disks are introduced, and is unviable when the target environment is the consumer market. In these situations, automatic recovery must be used when possible.

Consequently, a system must differentiate between current and stale copies of the data to access appropriate copies of the data when failures occur. There are several methods in use for managing mirrored storage. Perhaps the simplest is to designate one copy as the primary copy. This method has the advantage of simplicity, but limits availability and necessitates manual intervention in the event of a failure.

The other well-known strategies are to use a quorum algorithm, or to write the mirrored set membership to a log. While using some form of a quorum consensus provides automatic recovery, a quorum collection reduces the availability of the system (requiring at least three drives, for example). Using a log has the advantage of providing excellent availability, but has the disadvantage of the added complexity of maintaining the log. Furthermore, a log is often not available.

It can be seen then that there is a need for an apparatus and method to establish and maintain the status of membership sets that does not rely on logging to represent the set of copies that are active.

It can also be seen that there is a need to update the status information in response to configuration changes to maintain the correct set of current copies.

SUMMARY OF THE INVENTION

To overcome the limitations in the prior art described above, and to overcome other limitations that will become apparent upon reading and understanding the present specification, the present invention discloses a fault tolerant storage system.

The present invention solves the above-described problems by providing a method and apparatus that maintains in stable storage an identification of which copies in a mirrored disk system are currently up to date without requiring the use of a logging mechanism or quorum collections.

A system in accordance with the principles of the present invention includes a plurality of mirrored disk drives, a processing unit for controlling the writing and reading of data units to and from mirrored disk drives, the processing unit further establishing and maintaining cohort sets for each mirrored disk drive. The cohort set represents the status of copies of the data units stored on the mirrored disk drives and contains membership information for redundant copies of data units stored in the plurality of mirrored disk drives. The membership information comprises a data structure of 2n status bits for identifying which disks contain current copies of the data units, where n is the number of disks in the system, and wherein the first n bits are used to indicate an intention to update the membership information for the copies and the second n bits are used indicate a current state of the membership information. The data structure may further include log(n) additional bits for identifying each mirrored disk.

One aspect of the present invention is that the cohort set for a disk drive represents the set of copies that participated in the last write.

Another aspect of the present invention is that the cohort set represents the known current disks, the cohort set being modified every time a failure is detected and every time a repair is completed.

Another aspect of the present invention is that the each mirrored disk is associated with a bit of the data structure.

Another aspect of the present invention is that a bit is on when the disk is available and off when the disk is not available.

Another aspect of the present invention is that the data units may include a collection of sectors.

Yet another aspect of the present invention is that the data units may include a disk sector, a logical cluster in an logical volume manager, or a complete logical volume in a logical volume manager.

Another aspect of the present invention is that the cohort set is established and administered by the system and the 2n status bits may be stored in the space allocation map for each physical volume.

Another aspect of the present invention is that the bits in the data structure are modified in all the disks that remain operational when a failure is detected by setting the bit off for the disk that is down.

Still another aspect of the present invention is that the modified data structure is copied to all of the disks that remain operational.

Another aspect of the present invention is that the updating of the membership information comprises writing an updated cohort set to all operational disks.

Another aspect of the present invention is that cascading failures are treated sequentially such that a new round of membership information is initiated if an additional disk becomes unavailable while the membership information is being updated.

Yet another aspect of the present invention is that the cohort set indicates that a copy is current if the cohort sets are equal and complete, and wherein cohort sets are equal if the cohort sets have the same membership and the cohort sets are complete if every copy in the subset made up of the union of the cohort sets is present.

Another aspect of the present invention is that two phases may be used to update the membership information, wherein the first n bits are written to identify an intention to update the membership information for the copies in the first phase, and the second n bits are updated to indicate the current state of the membership information and the first n bits being cleared in the second phase.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus that maintains in stable storage an identification of which copies in a mirrored disk system are currently up to date without requiring the use of a logging mechanism or quorum collection (i.e., voting). The method and apparatus are based on first associating a unique identity with each copy and then tracking which copies are current. Each time a copy becomes unavailable and a client of the service wants to write data, the new state is modified to reflect the current set of available copies. When a copy that was unavailable becomes available a repair process is initiated. The out of date copies are first brought up to date from current copies and then the system state is modified to reflect that now the set of synchronized copies is larger.

Figure 1:
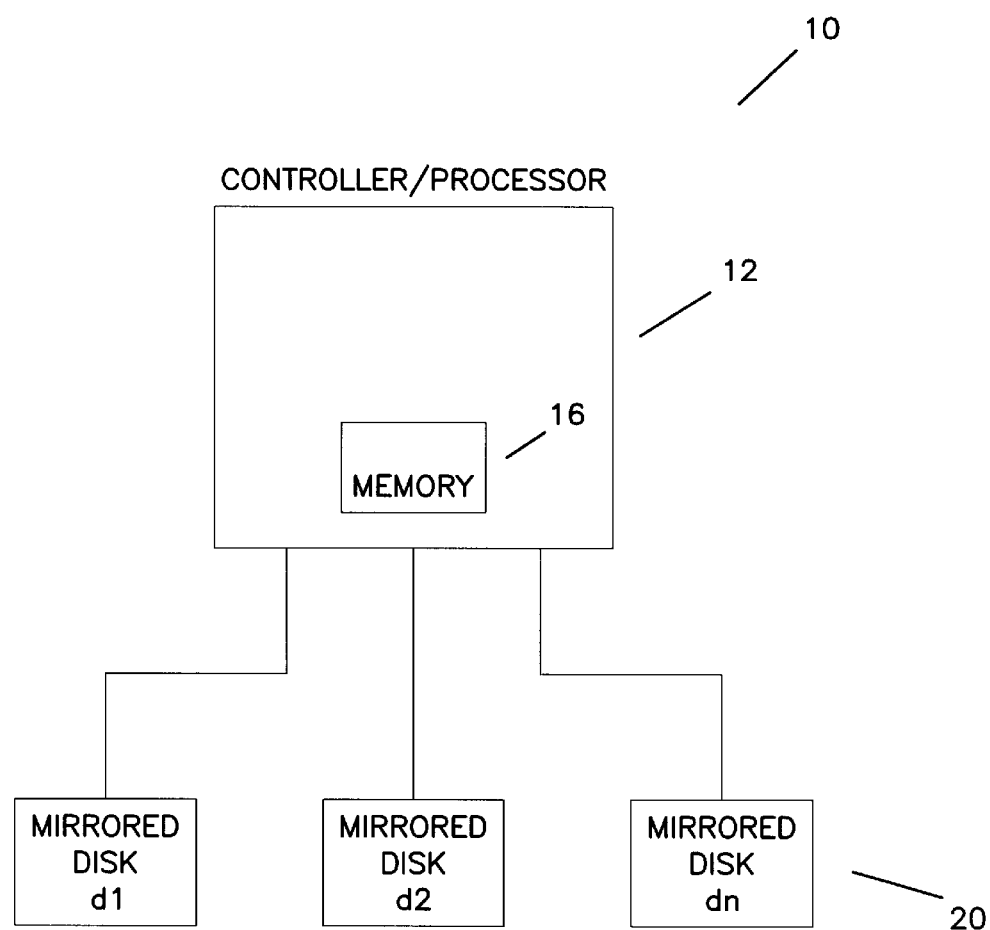
FIG. 1 illustrates a mirrored disk system in accordance with the present invention.

FIG. 1 illustrates an exemplary system 10 which incorporates mirrored disk storage according to the present invention. The system 10 includes a controller or processor 12 and a plurality of mirrored disks 20. The controller 12 has a memory 16. Each of the plurality of mirrored disks 20 ($d_1$, $d_2$, ... $d_n$) contain basically identical data. Updates are made to the data in the mirrored disks 20 when a copy of data in one of the mirrored disks is updated. The status of data in the mirrored disks 20 is maintained in a cohort set associated with each of the mirrored disks. The cohort sets may be stored in the memory 16.

Figure 2:
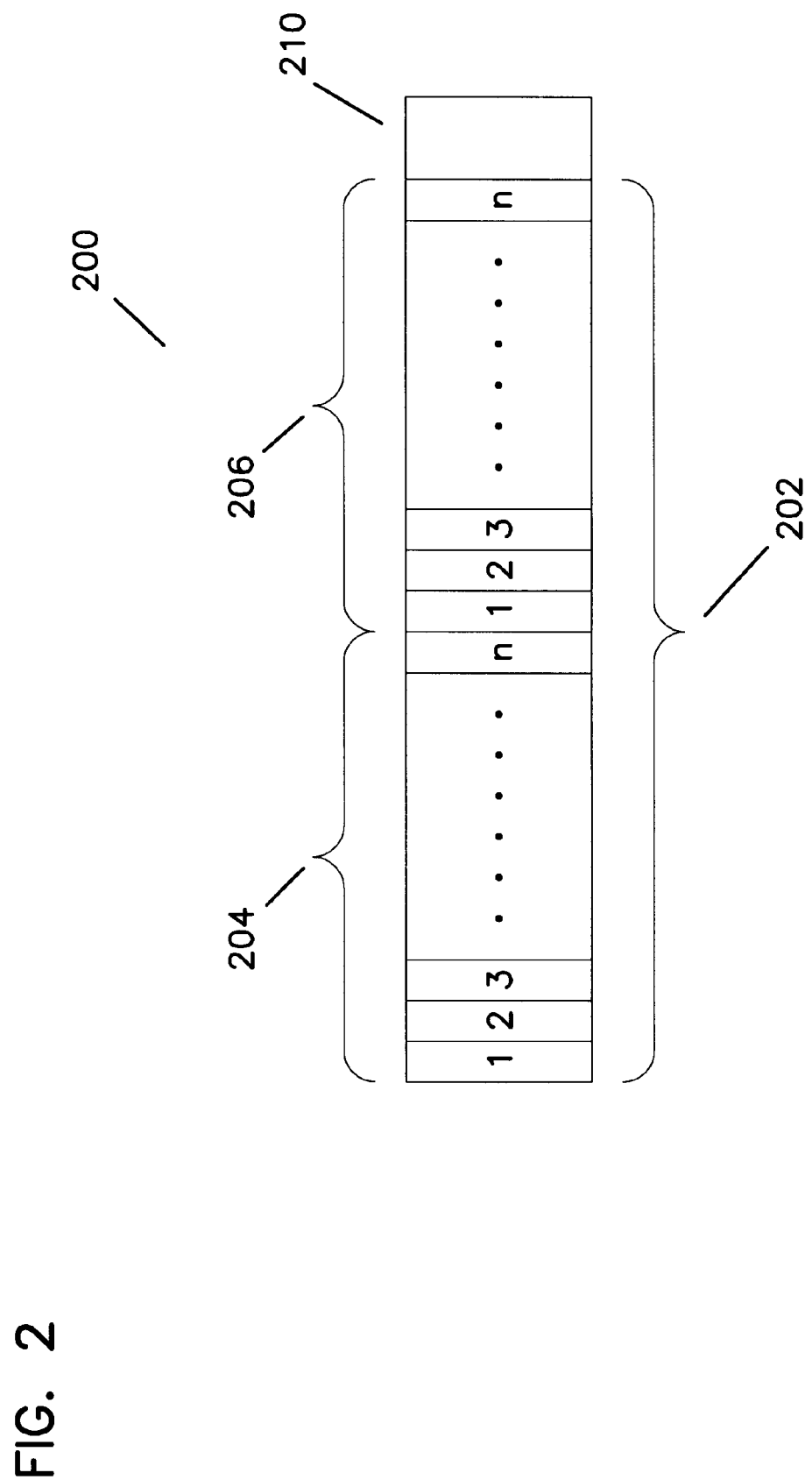
FIG. 2 illustrates the data structure of the cohort sets according to the present invention.

According to the present invention, current copies of data are tracked using a simple data structure called cohort sets. FIG. 2 illustrates the data structure 200 of the cohort sets according to the present invention. Membership information is recorded in cohort sets 202. A cohort set 202 for any copy represents the set of copies that participated in the last write that involved that copy. According to the present invention, a cohort set 202 requiring only 2n bits of hardened system data (or metadata) is required in order to determine which disks are current, where n is the number of disks in the system. The first n bits or indicators 204 are used to record the intention to update the membership state (i.e., tentative cohort set) and the remaining n bits 206 are used to record the official state of the membership state (i.e., committed cohort set). An additional log(n) bits 210 may be necessary to identify each disk if the disks do not have an implicit total ordering.

Referring to both FIGS. 1 and 2, in a system with disks 20 ($d_1$, $d_2$, . . . . $d_n$) the cohort set 202 for disk $d_1$ 22, denoted $C_d$, is the set of disks involved in the most recent write with disk $d_1$ 22 or that have been repaired from disk $d_1$ 22. The cohort set 202 represents the disks that are known to be current. The cohort set 202 is modified every time a failure is detected and every time a repair has been completed.

With reference to FIG. 2, each disk used in mirroring is associated a specific bit in each of the two groups of indicators 204, 206. Thus, if 3 disks are to be used for mirroring then a bit vector with 3 bits is needed to represent them. The cohort set 202 has a corresponding identity bit on (value 1) when a disk is available and off (value 0) when a disk is not available.

For each unit of data that wants to be mirrored, be it a disk sector, or a logical cluster in an LVM, or a complete logical volume in an LVM, a cohort set $C_d$ 202 is established by the system and administered by the system. The 2n status bits 202 are kept in the space allocation map for each physical volume.

Since the cohort set 202 contains the identity of all the disks that are current, the system is able to recognize whether the corresponding cohort sets 202 represent current data or not when a previously unavailable disk becomes available. This process involves first updating the contents of the cohort sets 202 when a failure has been detected.

Then the mirror set is repaired when a disk is brought up. The corresponding cohort set is updated when the repair is complete. Finally, the system recognizes whether the complete set of copies is on line or not.

When a failure is detected, normally while executing a mirrored write operation, the cohort set 202 is modified in all the disks that remain operational by setting the bit off for the disk that is down and updating the content of the cohort sets 202 in all the remaining operational disks. Only after this membership update has been completed, that is, the updated cohort set 202 has been written to all the appropriate disks, can the write operation that prompted the detection of the failure proceed. Cascading failures are treated sequentially, that is, if disks become unavailable while updating the membership information a new round of membership information is initiated. If there is no failure, the cohort sets are untouched, thereby facilitating optimal performance.

While no new failures are detected or no disks become available again, the system operates using the revised cohort set 202 to identify what disks are operational and current. When access to a failed disk is reestablished, be it because it came back on-line or because the complete system is being brought on-line after being off, the system inspects the corresponding cohort sets 202 to determine which are the mirror copies of the data.

Only after all the disks present in the revised cohort sets 202 have been contacted and all corresponding cohort sets 202 coincide, can read or write operations be directed to the data. Thus, if a cohort set 202 states that 3 disks are up (because it has the 3 corresponding bits turned on) then those exact three disks have to have the same bits turned on in their cohort sets 202, for the system to determine that the correct set of current copies have been found. If two corresponding cohort sets 202 do not coincide, then the system finds the current copies when all the disks named in a cohort set 202 are found and their cohort sets 202 have the exact same bits turned on. In particular, a cohort set 202 with only one bit turned on states that it is the 'last copy' of a piece of data and hence that it is the current one.

During the repair process, the data obtained from a valid copy is first synchronized and then the corresponding cohort set 202 is updated. The repair process may be done in parallel to normal I/O activity beginning from any disk in the current up-to-date set.

Figure 3:
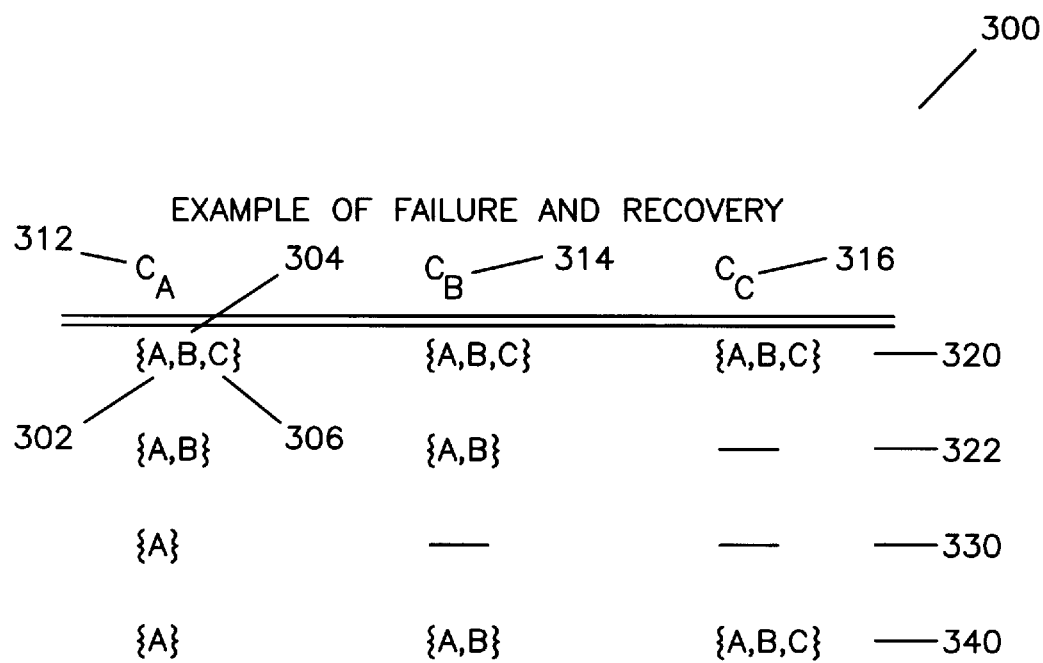
FIG. 3 illustrates an example of maintaining and using cohort sets according to the present invention.

FIG. 3 illustrates an example 300 of maintaining and using cohort sets according to the present invention. If there are three copies, A 302, B 304 and C 306, then $C_A$ 312, $C_B$ 314 and $C_C$ 316 are the corresponding cohort sets.

The system starts 320 with a full complement of copies 302, 304, 306. At some time in the future 322, copy C 306 fails, and a write operation occurs. The state of the system is reflected in the second row 322 of the table, where $C_A$ 312=$C_B$ 314={A 302, B 304}, which indicates that copies A 302 and B 304 were the only participants in the last write operation. At some point further on 330, copy B 304 also fails, followed by a write operation. This is reflected in the third row 330, where only copy A 302 is current. Thereafter, the other two copies, i.e., B 304 and C 306, recover. This state is reflected in the fourth row 340. At this point only copy A is current, since $C_A$ 312={A 302}.

The necessary and sufficient conditions for recovery is that a subset of copies can be found such that their cohorts sets $C_A$ 312, $C_B$ 314 and $C_C$ 316 are both equal and complete. This means that for a group of copies to be current, any copy listed in any of the cohort sets must be accessible, and the cohort sets associated with these copies must all be equal. It should be clear that the last copy or copies to fail must be represented by this set, since if any of the copies had participated in subsequent write operation, then its cohort set would not contain the copies that did not participate in this operation.

The cohort sets $C_A$ 312, $C_B$ 314 and $C_C$ 316 are the critical metadata items for mirrored operation. The cohort sets $C_A$ 312, $C_B$ 314 and $C_C$ 316 must be correct for the recovery to operate correctly.

Figure 4:
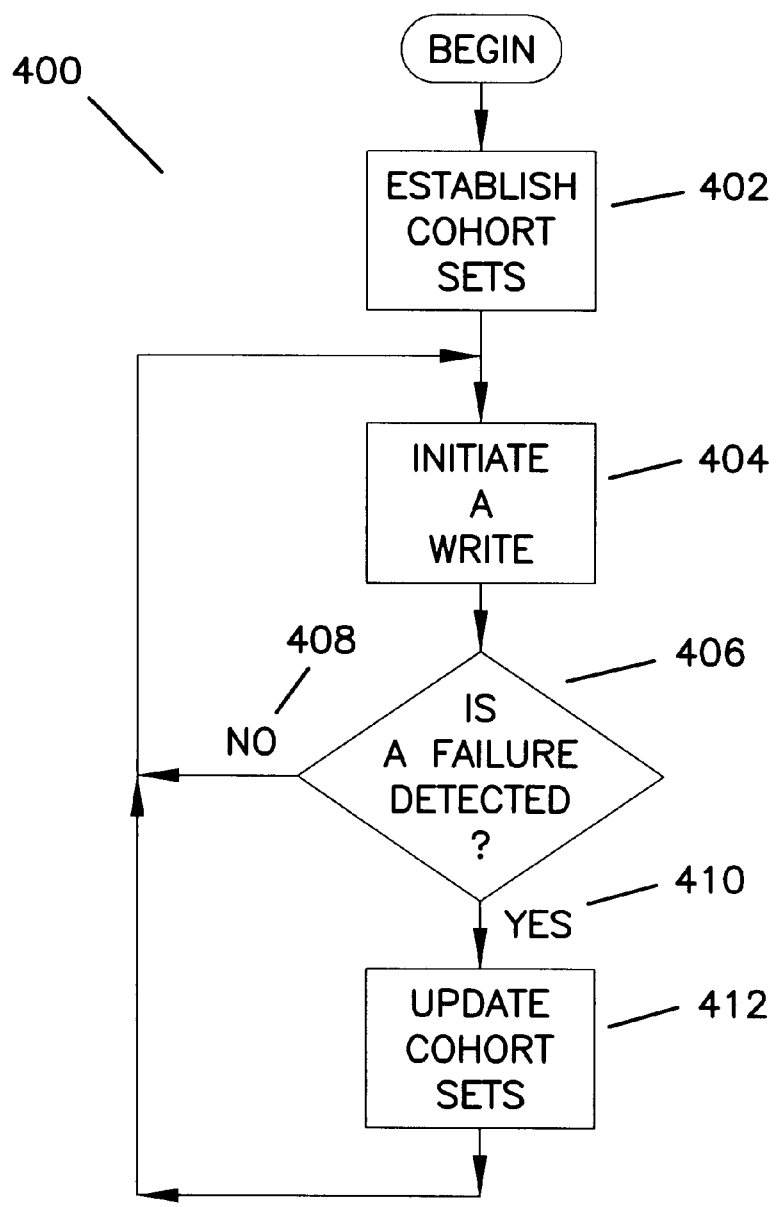
FIG. 4 is a flowchart illustrating the establishment and updating of cohort sets according to the invention.

FIG. 4 is a flowchart 400 illustrating the establishment and updating of cohort sets according to the invention. Membership information is established 402 in cohort sets for the copies of data contained in the mirrored disk drives. Next, a mirrored write operation is initiated 404. During the write operation the disk controller monitors the mirrored disk system for failures 406. If no failure is detected during the execution of the write operation 408, further write operations may proceed in a like manner since the cohort sets reflect the current copies. If a failure is detected during the execution of the write operation 410, the content of the cohort sets is updated 412.

Figure 5:
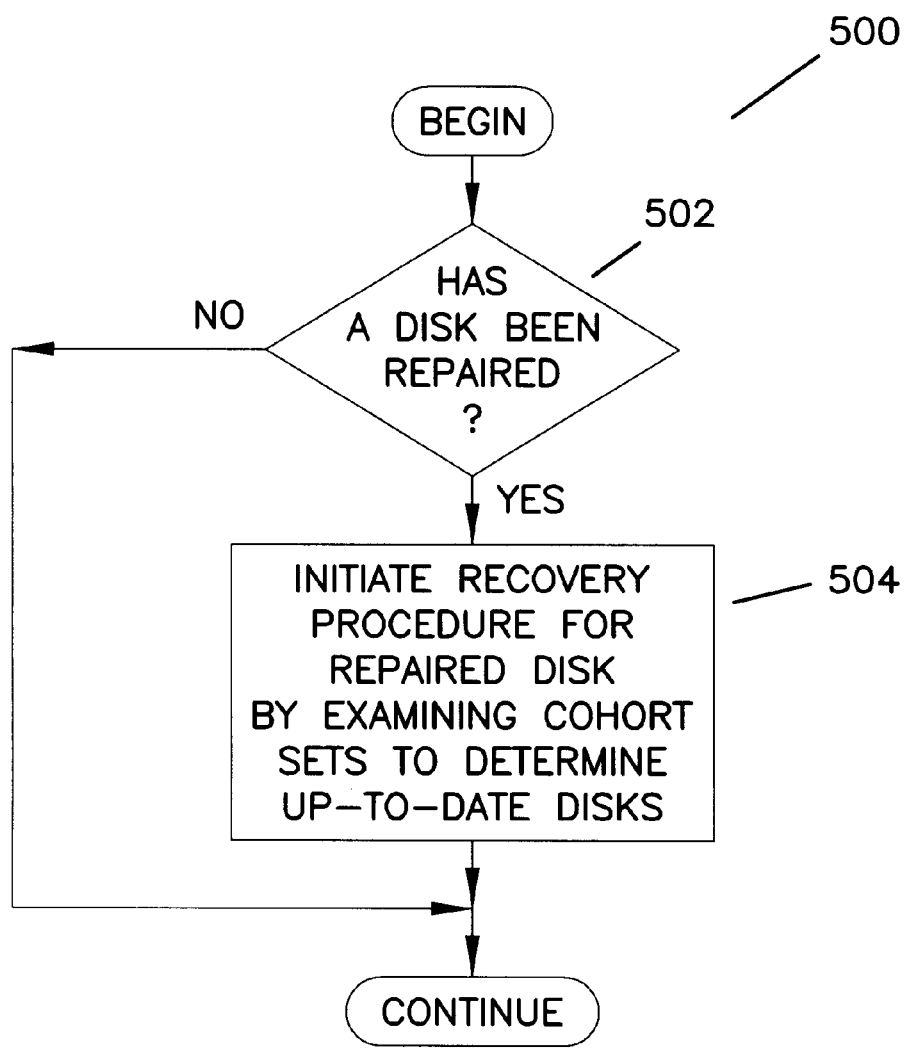
FIG. 5 is a flowchart illustrating the processes which occur when a disk is repaired.

FIG. 5 is a flowchart 500 illustrating the processes which occur when a disk is repaired. After a failure, the system operates as illustrated in FIG. 4. However, whenever a disk is repaired 502, a recovery procedure is initiated wherein the cohort sets are examined to determine which disks are up-to-date 504. Repair of a failed disk is a process that is independent from write operations.

As discussed above with reference to FIG. 4, it was assumed that the cohort sets were completely written to stable storage following the detection of a failure. While extremely rare, it is possible that a second failure could occur while the cohort sets were being written. In order to mitigate the effects of this unlikely failure scenario, two phases are used to write the cohort sets to stable storage.

Figure 6:
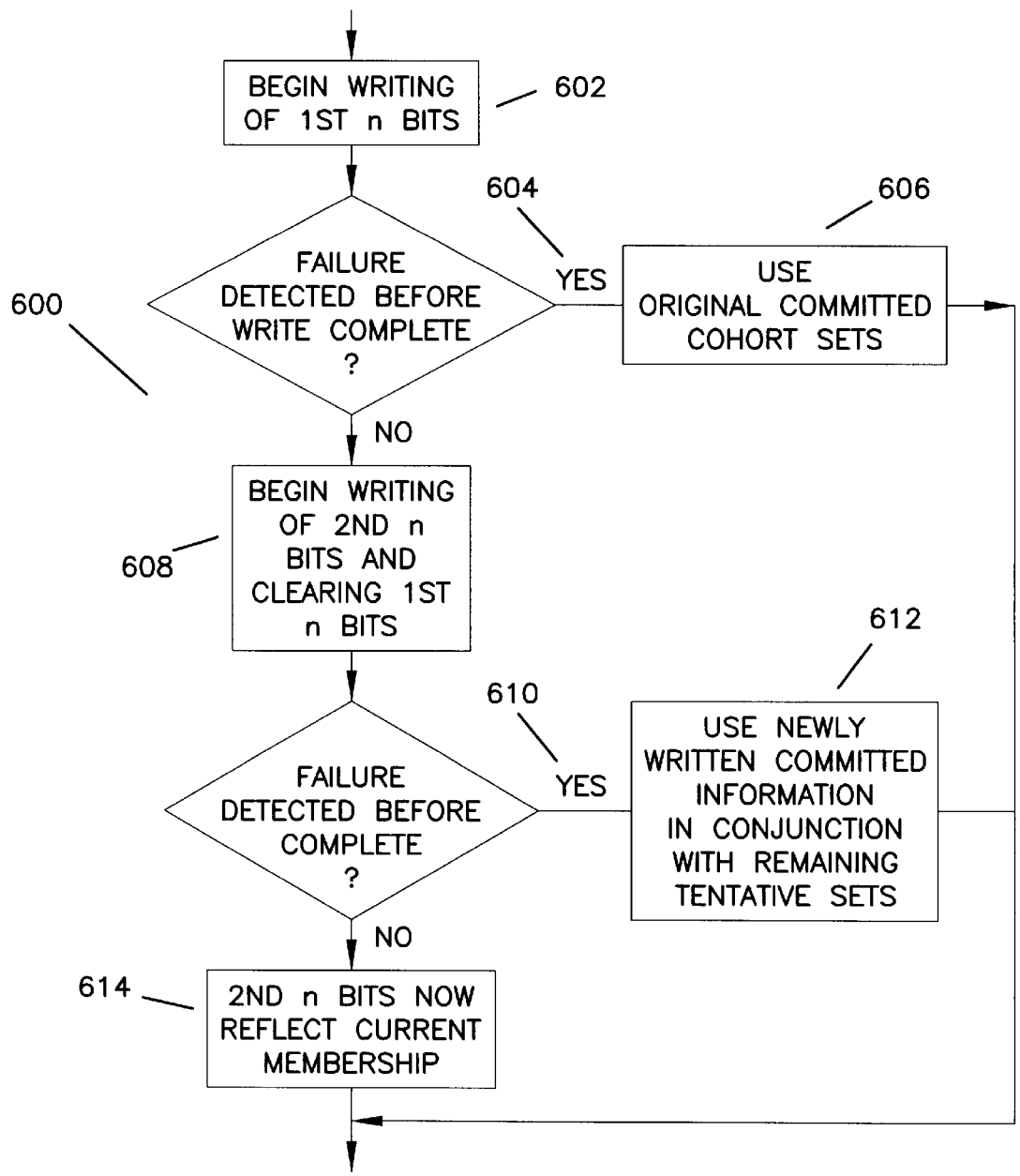
FIG. 6 illustrates a detailed view of the two-phase update process.

FIG. 6 illustrates a detailed view of the two-phase update process 600. First the updating of the tentative cohort sets is initiated 602 in the first phase. If this fails 604, the system can fall back to the original committed cohort sets 606. In the second phase, the updating of the committed cohort sets is initiated 608. Should this fail 610, then the tentative cohort sets that remain can be used in conjunction with the newly committed cohort sets 612. Otherwise, the tentative cohort sets are cleared and the complete committed cohort sets are written 614.

All cohort sets are modified when a write operation occurs following a failure. It is assumed that write operations are sufficiently frequent to provide sufficiently fine grained failure detection. If this is not the case, then cohort sets can be modified when read operations occur. Furthermore, an asynchronous failure notification mechanism may be used to modify the cohort sets.

It should be noted that correct operation does not depend on the granularity of failure detection. The granularity is only important for the availability of the system, since rapid failure detection will mean that the information in the cohort sets is current and this provides for more rapid recovery. This is easy to see in the case of no failure detection, then the cohort sets would always indicate every copy, which would mean that every copy would have to be present for the system to recover.

There is a possibility that a write operation may fail, or be interrupted, before all of the copies can be written. As a result, only a subset of the copies hold the latest version of the data. Subsequent read operations may get different results, depending on which disk satisfies the request.

Instead, it is desirable that single-copy semantics be provided, i.e., the mirrored storage behaves like a single disk. Referring again to FIG. 2, a "dirty bit" 210 is used in order to accomplish this task. This bit 210 is replicated on each disk, and is set before a write operation first occurs to some portion of the disk. This bit 210 is reset ("cleaned") when the disk is quiescent.

When the system recovers, the "dirty bit" 210 is used to provide single-copy semantics. If the "dirty bit" 210 is set, then a valid (usually the first) copy is copied to the others that make up the mirrored set. A valid copy is any copy that satisfies the currency requirements. Since a write may have failed before it could complete on all disks, a small number of writes may be lost. While it may be desirable to never lose a write, the performance cost is prohibitive.

Figure 7:
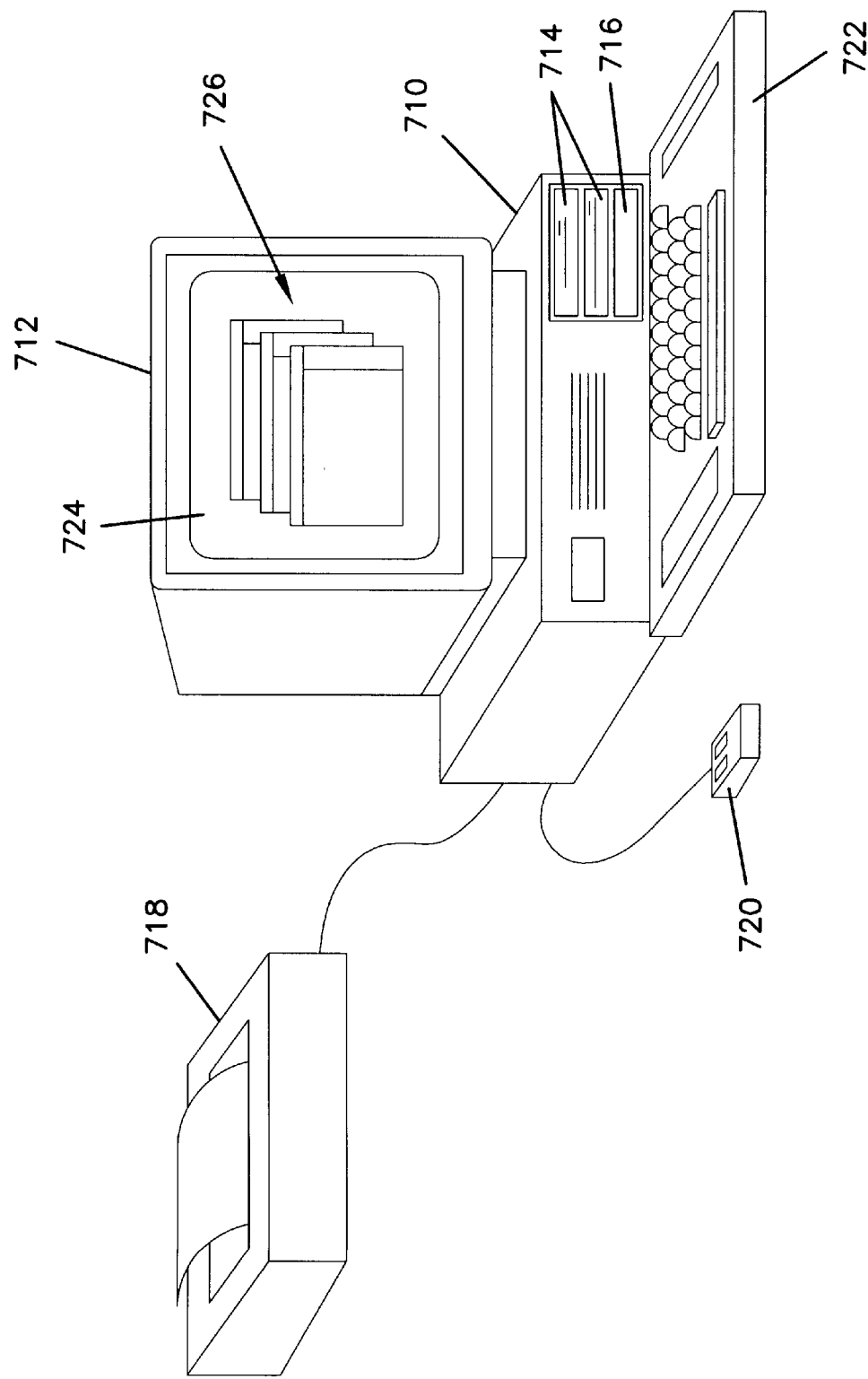
FIG. 7 is a block diagram that illustrates an exemplary hardware environment of the present invention.

FIG. 7 is a block diagram that illustrates an exemplary hardware environment of the present invention. The present invention is typically implemented using a computer 710 comprised of a microprocessor, random access memory (RAM), read-only memory (ROM), and other standard components. It is envisioned that attached to the computer 710 may be a monitor 712, floppy disk drives 714, CD-ROM drives 716, and printer 718 peripherals. Also included in the preferred embodiment may be input devices, for example, a mouse pointing device 720 and a keyboard 722.

The computer 710 operates under the control of an operating system 724, such as the Windows, OS/2, Macintosh, or UNIX operating systems, which is represented in FIG. 7 by the screen display on the monitor 712. The computer 710 executes one or more computer programs 726, which are represented in FIG. 7 by the "windows" displayed on the monitor 712, under the control of the operating system 724. The present invention comprises a mirrored disk management function that is preferably implemented in the operating system 724 and/or computer programs 726.

Generally, the operating system 724 and the computer programs 726 may be tangibly embodied in a computer-readable medium or carrier, e.g. one or more of the fixed and/or removable data storage devices 714 and 716, or other data storage or data communications devices. Both the operating system 724 and the computer programs 726 may be loaded from the data storage devices 714 and 716 into the random access memory of the computer 710 for execution by the microprocessor as discussed above with reference to FIG. 7. Both the operating system 724 and the computer programs 726 comprise instructions which, when read and executed by the microprocessor of the computer 710, causes the computer 710 to perform the steps necessary to execute the steps or elements of the present invention.

Although an exemplary computer system configuration is illustrated in FIG. 7, those skilled in the art will recognize that any number of different configurations performing similar functions may be used in accordance with the present invention.

In summary, the technique of mirroring can be deployed in computing systems that do not have a logging or journaling subsystem. System data is minimal since one bit is used to represent membership and a second bit is used to represent the intention to update the membership. Further, the method is n−1 resilient, which means that n−1 failures can be tolerated. All disks may be peers, since there is no master disk needed between them. Finally, the system data requires updating only when a failure is detected.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for maintaining the status of redundant copies of data on mirrored disk drives in a mirrored storage system, each of the mirrored disk drives including a copy of data, comprising a current copy indicator associated with each of the redundant copies of data wherein the current copy indicator further comprises a first set of identifiers indicating when a copy on one of the mirrored disk drives is to be updated and a second set of identifiers indicating the state of each of the copies.

2. The apparatus of claim 1 wherein the first and second identifier are modified to reflect the current set of available copies when a copy becomes unavailable and a write operation is requested.

3. The apparatus of claim 1 wherein the current copy indicator is updated when unavailable copies are repaired.

4. The apparatus of claim 1 wherein out of date copies are updated using copies identified by the current copy indicator and the current copy indicator is modified to reflect a new status for the redundant copies.

5. A system of mirrored disk drives containing redundant copies of data units, the system comprising;
 a plurality of mirrored disk drives; and
 a processing unit, coupled to the mirrored disk drives, for controlling the writing and reading of data units to and from mirrored disk drives; and wherein the processing unit establishes and maintains cohort sets for each mirrored disk drive, the cohort set representing status of copies of the data units stored on the mirrored disk drives, the cohort sets containing membership information for redundant copies of data units stored in the plurality of mirrored disk drives, the membership information comprising a data structure of 2n status bits for identifying which disks contain current copies of the data units, where n is the number of disks in the system, wherein the first n bits indicate an intention to update the membership information for the copies and the second n bits indicate a current state of the membership information.

6. The system of claim 5 wherein the processing unit comprises a memory.

7. The system of claim 5 wherein the cohort set for a drive represents the set of copies that participated in the last write.

8. The system of claim 5 wherein the data structure further comprises log(n) additional bits for identifying each mirrored disk.

9. The system of claim 5 wherein the cohort set represents the known current disks, the cohort set being modified every time a failure is detected and every time a repair is completed.

10. The system of claim 5 wherein each mirrored disk is associated with a bit of the data structure.

11. The system of claim 10 wherein a bit is on when the disk is available and off when the disk is not available.

12. The system of claim 5 wherein the data units comprises a unit of storage.

13. The system of claim 5 wherein the cohort set is established and administered by the system.

14. The system of claim 5 wherein the 2n status bits are stored in the space allocation map for each physical volume.

15. The system of claim 5 wherein the cohort set enables the system to recognize whether a complete set of copies is on line.

16. The system of claim 5 wherein the bits in the data structure are modified in all the disks that remain operational when a failure is detected by setting the bit off for the disk that is down.

17. The system of claim 16 wherein the modified data structure is copied to all of the disks that remain operational.

18. The system of claim 5 wherein updating of the membership information comprises writing an updated cohort set to all the disks that remain operational.

19. The system of claim 5 wherein cascading failures are treated sequentially such that a new round of membership information is initiated if an additional disk becomes unavailable while the membership information is being updated.

20. The system of claim 5 wherein the cohort set indicates that a copy is current if the cohort sets are equal and complete.

21. The system of claim 20 wherein cohort sets are equal if the cohort sets have the same membership and the cohort sets are complete if every copy in a subset comprising the union of the cohort sets is present.

22. The system of claim 5 wherein two phases are used to update the membership information, the first n bits being written to identify an intention to update the membership information for the copies in the first phase, and the second n bits being updated to indicate the current state of the membership information and the first n bits being cleared in the second phase.

23. The system of claim 5 wherein the cohort sets are modified when a write operation occurs following a failure.

24. A method of maintaining the status of mirrored disk drives containing redundant copies of data, the method comprising the steps of:

establishing a cohort set on each of the mirrored disk drive representing a status of the copies stored on the mirrored disk drives, the cohort set containing membership information for redundant copies of data units stored in the plurality of mirrored disk drives, the membership information comprising a data structure of 2n status bits for identifying which disks contain current copies of the data units, where n is the number of disks in the system, wherein the first n bits indicate an intention to update the membership information for the copies and the second n bits indicate a current state of the membership information; and updating the contents of the cohort sets when a disk drive failure has been detected to reflect unavailability of the copy of data on the failed disk drive.

25. The method of claim 24 further comprising the steps of:

repairing the copy of data on the failed disk drive when the failed disk drive is brought up; and revising the cohort sets when the repair is complete to reflect availability of the repaired disk drive.

26. The method of claim 24 further comprising the steps of:

writing the first n bits to identify an intention to update the membership information for the copies in a first phase; and updating the second n bits to indicate the current state of the membership information and clearing the first n bits in a second phase.

27. The method of claim 24 wherein the step of updating the cohort set is performed every time a failure is detected and every time a repair is completed.

28. The method of claim 24 wherein the step of updating the membership information further comprises the step of modifying the membership information of all disks that remain operational when a failure is detected.

29. The method of claim 28 wherein the step of modifying the membership information of all disks that remain operational further comprises the step setting a bit off for a disk that is not operational.

30. The method of claim 29 wherein the modified membership information is copied to all of the disks that remain operational.

31. A metadata file structure stored on each of a plurality of mirrored disk drives containing redundant copies of data units, the metadata file structure comprising a first and second set of n identifiers, wherein n is the number of mirrored disk drives and each identifier represents a mirrored disk drive, the first set of n identifiers indicating disk drives to be updated and the second set of identifiers indicating what disk drives contain current copies.

32. The metadata file structure of claim 31 wherein an identifier is set to an on indication when the disk is available and to an off indication when the disk is not available.

33. The metadata file structure of claim 31 wherein the first and second set of n identifiers represents the set of copies that participated in the last write involving the copy.

34. The metadata file structure of claim 31 wherein the first and second set of n identifiers represent membership information for redundant copies of data units stored in the plurality of mirrored disk drives.

35. The metadata file structure of claim 31 further comprising log(n) additional identifiers for identifying each mirrored disk.

36. The metadata file structure of claim 31 wherein the first and second set of n identifiers represent the known current disks, the first and second set of n identifiers being modified every time a failure is detected and every time a repair is completed.

37. The metadata file structure of claim 31 wherein each mirrored disk is associated with an identifier in each of the first and second set of n identifiers.

38. The metadata file structure of claim 37 wherein an identifier is set to an on indication when the disk is available and to an off indication when the disk is not available.

39. The metadata file structure of claim 31 wherein the data units comprises a unit of storage.

40. The metadata file structure of claim 31 wherein the first and second set of n identifiers are established and administered by the system.

41. The metadata file structure of claim 31 wherein the first and second set of n identifiers are stored in the space allocation map for each physical volume.

42. The metadata file structure of claim 31 wherein the first and second set of n identifiers enable the system to recognize whether a complete set of copies is on line.

43. The metadata file structure of claim 31 wherein the first and second set of n identifiers are modified in all the disks that remain operational when a failure is detected by setting the bit off for the disk that is down.

44. The metadata file structure of claim 43 wherein the modified first and second set of n identifiers are copied to all of the disks that remain operational.

45. The metadata file structure of claim 31 wherein cascading failures are treated sequentially such that the updating of the first and second set of n identifiers is reinitiated if an additional disk becomes unavailable while the first and second set of n identifiers are being updated.

46. The metadata file structure of claim 31 wherein the first and second set of n identifiers indicate that a copy is current if each first and second set of n identifiers stored on the disks are equal and complete.

47. The metadata file structure of claim 46 wherein each first and second set of n identifiers is equal if each of the first and second set of n identifiers have the same information and each of the first and second set of n identifiers are complete if every copy is represented in each of the first and second set of n identifiers.

48. The metadata file structure of claim 31 wherein the first and second set of n identifiers are modified when a write operation occurs following a failure.

49. A program storage device, readable by a computer, tangibly embodying one or more programs of instructions executable by the computer to perform method steps for managing mirrored disk drives containing redundant copies of data, the method comprising the steps of:
establishing a cohort set on each of the mirrored disk drives representing a status of the copies stored on the mirrored disk drives, the cohort set containing membership information for redundant copies of data units stored in the plurality of mirrored disk drives, the membership information comprising a data structure of 2n status bits for identifying which disks contain current copies of the data units, where n is the number of disks in the system, wherein the first n bits indicate an intention to update the membership information for the copies and the second n bits indicate a current state of the membership information; and
updating the contents of the cohort sets when a disk drive failure has been detected to reflect unavailability of the copy of data on the failed disk drive.

50. The program storage device of claim 49 further comprising the steps of:
repairing the copy of data on the failed disk drive when the failed disk drive is brought up; and
revising the cohort sets when the repair is complete to reflect availability of the repaired disk drive.

51. The program storage device of claim 49 further comprising the steps of:
writing the first n bits to identify an intention to update the membership information for the copies in a first phase; and
updating the second n bits to indicate the current state of the membership information and clearing the first n bits in a second phase.

52. The program storage device of claim 49 wherein the step of updating the cohort set is performed every time a failure is detected and every time a repair is completed.

53. The program storage device of claim 49 wherein the step of updating the membership information further comprises the step of modifying the membership information of all disks that remain operational when a failure is detected.

54. The program storage device of claim 53 wherein the step of modifying the membership information of all disks that remain operational further comprises the step setting a bit off for a disk that is not operational.

55. The program storage device of claim 53 wherein the modified membership information is copied to all of the disks that remain operational.

56. A memory for storing data for managing mirrored disk drives containing redundant copies of data, comprising:
a data structure stored in a memory of each of the mirrored disk drives, each of the data structure including a first and second set of n identifiers, wherein n is the number of mirrored disk drives and each identifier represents a mirrored disk drive, the first set of n identifiers indicating disk drives to be updated and the second set of identifiers indicating what disk drives contain current copies.

57. The memory of claim 56 wherein an identifier is set to an on indication when the disk is available and to an off indication when the disk is not available.

58. The memory of claim 56 wherein the first and second set of n identifiers represents the set of copies that participated in the last write involving the copy.

59. The memory of claim 56 wherein the first and second set of n identifiers represent membership information for redundant copies of data units stored in the plurality of mirrored disk drives.

60. The memory of claim 56 further comprising log(n) additional identifiers for identifying each mirrored disk.

61. The memory of claim 56 wherein the first and second set of n identifiers represent the known current disks, the first and second set of n identifiers being modified every time a failure is detected and every time a repair is completed.

62. The memory of claim 56 wherein each mirrored disk is associated with an identifier in each of the first and second set of n identifiers.

63. The memory of claim 62 wherein an identifier is set to an on indication when the disk is available and to an off indication when the disk is not available.

64. The memory of claim 56 wherein the data units comprises a unit of storage.

65. The memory of claim 56 wherein the first and second set of n identifiers are established and administered by the system.

66. The memory of claim 56 wherein the first and second set of n identifiers are stored in the space allocation map for each physical volume.

67. The memory of claim 56 wherein the first and second set of n identifiers enable the system to recognize whether a complete set of copies is on line.

68. The memory of claim 56 wherein the first and second set of n identifiers are modified in all the disks that remain operational when a failure is detected by setting the bit off for the disk that is down.

69. The memory of claim 68 wherein the modified first and ,second set of n identifiers are copied to all of the disks that remain operational.

70. The memory of claim 56 wherein cascading failures are treated sequentially such that the updating of the first and second set of n identifiers is reinitiated if an additional disk becomes unavailable while the first and second set of n identifiers are being updated.

71. The memory of claim 56 wherein the first and second set of n identifiers indicate that a copy is current if each first and second set of n identifiers stored on the disks are equal and complete.

72. The memory of claim 71 wherein each first and second set of n identifiers is equal if each of the first and second set of n identifiers have the same information and each of the first and second set of n identifiers are complete if every copy is represented in each of the first and second set of n identifiers.

73. The memory of claim 66 wherein the first and second set of n identifiers are modified when a write operation occurs following a failure.

* * * * *